United States Patent

[11] 3,631,840

| [72] | Inventor | Ann M. McCormack |
| | | 66 Lyon Road, Waldwick, N.J. 07463 |
| [21] | Appl. No. | 860,361 |
| [22] | Filed | Sept. 23, 1969 |
| [45] | Patented | Jan. 4, 1972 |

[54] ELECTRONICALLY TIMED ANIMAL FEEDER
3 Claims, 5 Drawing Figs.

[52] U.S. Cl. .................................................. 119/51.12
[51] Int. Cl. ............................................... A01k 05/00
[50] Field of Search ..................................... 119/51.12, 51.5

[56] References Cited
UNITED STATES PATENTS

| 2,528,742 | 11/1950 | Coffing | 119/51.12 |
| 2,554,086 | 5/1951 | Block | 119/51.5 |
| 3,180,316 | 4/1965 | Chatfield et al. | 119/51.12 |
| 3,330,256 | 7/1967 | De Vaux | 119/51.12 |

*Primary Examiner*—Hugh R. Chamblee
*Attorney*—Constantine A. Michalos

ABSTRACT: An electronically timed animal feeder having one or more removable bowls containing animal food supported within an enclosed container incorporating a spring-loaded locked lid. A timer, which can be set at a desired predetermined time, includes a solenoid or an actuator which is activated by the timer to unlock the lid and open it to expose the bowl and its food content so that the animal can eat at the set time.

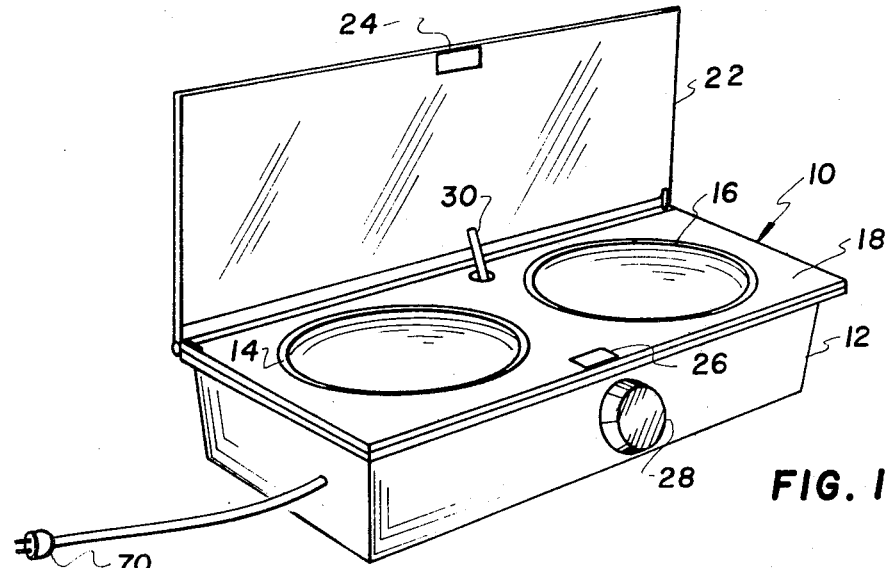
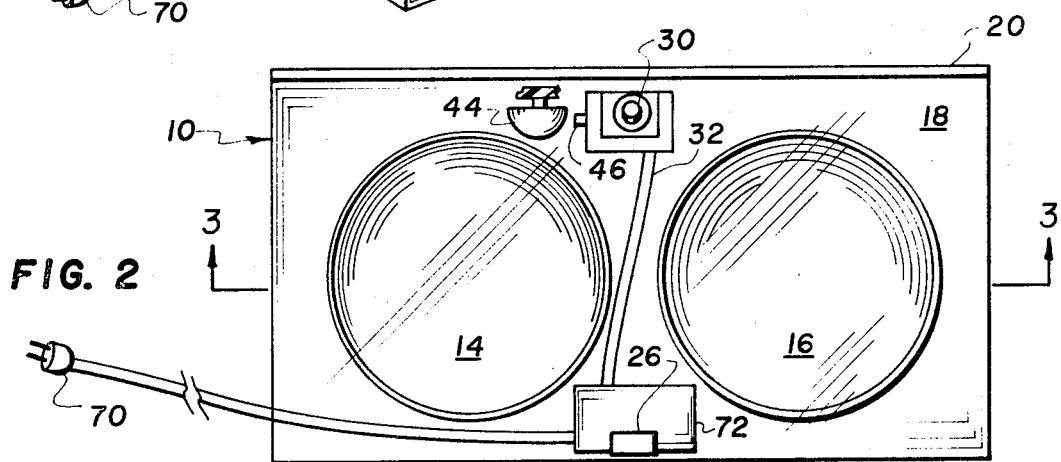
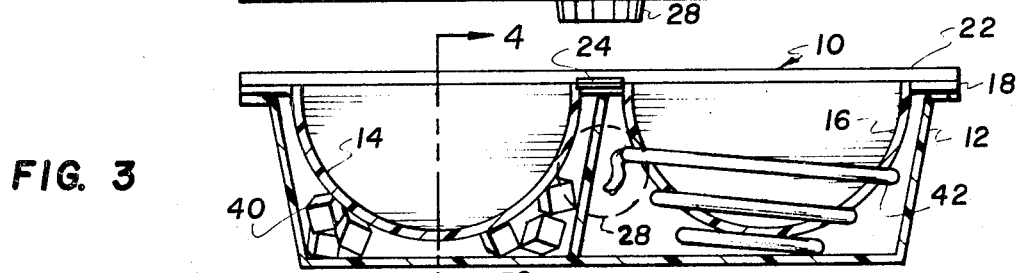
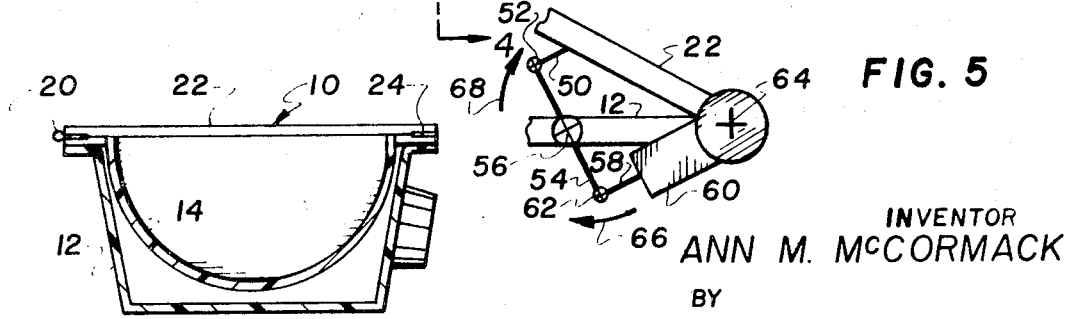
INVENTOR
ANN M. McCORMACK
BY
Constantine A. Michalos
ATTORNEY 3,631,840

ELECTRONICALLY TIMED ANIMAL FEEDER

BACKGROUND OF THE INVENTION

In feeding of animals such as pet dogs, or pet cats or farm animals, a common problem is encountered by the animal caretakers or owners in leaving their pet dogs or pet cats or other animals at home with no provision for feeding the animals during their absence. The need for feeding an animal during their absence is usually delegated to a neighbor or to a pet shop or the farmer-owner has to provide a farmhand to feed the animals. Sometimes a member of the family or the farmer himself has to stay behind in order to assure that the animal is fed at its proper time. Further, if the owners of the animal are somehow preoccupied, the pet or farm animal may be left for long periods without being fed.

There is a need for a commercial version of the electronically timed animal feeder that can be used by farmers, kennel owners and veterinarians. This feeder can be an important labor-saving implement for feeding herds of animals. Dairy farms, stables, zoos and even institutions specializing in breeding animals for experimental purposes will find this feeding implement indispensable as a labor-saving device. A multiple feeding unit would allow a farmer to fill the unit with food the night before and without awakening in the morning automatically feed substantially all his animals.

BRIEF SUMMARY OF THE INVENTION

It is the purpose of this invention to provide for a simple concept in animal feeding which presents a substantially safe and precisely timed feeding implement that is used to feed an animal or animals at a predetermined time whether its owner is at home or away.

Further, it is the purpose of this invention to keep the food in either a warm or cold condition, depending on the type of food stored in the feeding implement until the time of consumption. The means of doing this is by an electronic timer in combination with an enclosed container having cold and hot compartments and which has a lid that only opens at a time set in the timer.

Therefore, an object of this invention is to provide for an enclosure supporting one or more feeding bowls and a spring-loaded lid operable by a timer to open at a desired predetermined time for feeding a pet animal.

Another object of this invention is to provide an electronically timed animal feeder which can open automatically by means of a mechanical timer actuating a lock.

A further object of this invention is to provide for an electronically timed animal feeder that is made of a durable material simple in design and that can be readily cleaned as needed.

An additional object of this invention is to provide for an electronically timed animal feeder which is simple in concept, substantially totally safe and precise in operation to assure that an animal is fed at the proper time whether its owner is at home or away.

A further object of this invention is to provide for a labor-saving electronic herd feeder for automatically feeding a plurality of animals at a desired predetermined time without the owner's immediate supervision.

Other objects and many additional advantages will be more readily understood by those skilled in the art after a detailed consideration of the following specification taken with the accompanying drawings wherein:

DRAWINGS

FIG. 1 is a perspective view showing the electronically timed feeder in accordance with a preferred embodiment of the invention;

FIG. 2 is a plan view of the invention shown in FIG. 1;

FIG. 3 is a sectional view taken substantially along line 3—3 of FIG. 2;

FIG. 4 is a sectional view taken substantially along line 4—4 of FIG. 3; and,

FIG. 5 is a side view partly in section showing another means of actuating the lid of the feeder shown in FIG. 1.

DETAILED DESCRIPTION

In the drawings, a typical application of the present invention is shown. It is to be understood that the present invention has application of any automatic feeding means for animals such as pet dogs, or pet cats or other animals wherein the food is enclosed by a lid which lid cannot be forced open by "nosing," pawing or pushing and thus the animals cannot get to the food until the lid is automatically opened by a timer set at a desired predetermined time.

Referring to the drawing, an electronically timed animal feeder 10 is shown having a durable plastic rectangular container 12 supporting a pair of removable plastic dishes or bowls 14 and 16. The plastic bowls 14 and 16 may be integral to a rectangular plastic plate 18 so that bowls 14 and 16 may be removed in one piece with the plate 18. It should be noted that the bowls 14 and 16 and the plastic plate 18 can be stamped out of a one-piece plastic and molded in forms to produce the two bowls as best shown in FIG. 2.

Supported at one rectangular border by means of a spring-loaded hinge 20, as best shown in FIG. 4, is a rectangular cover or lid 22 which has a magnetically attractable metal plate 24 at the central position at the border opposite the hinge 20 of the rectangular lid 22. When the lid 22 is closed, the metal plate 24 will hold the lid 22 flat against the plate 18 and keep the container 12 closed by means of a magnetic latch 26. The latch 26 is either a permanent magnet or an electromagnet which releases its magnetic force by means of a timer 28 which can be either a mechanical or electric clock which can be preset up to 12 hours. The clock within the timer, set for a desired time, activates an electric solenoid 30 which releases the latch 26 holding the lid 22 closed. Where lid 22 is held closed by a permanent magnet the timer 28 activates the solenoid to force plate 24 away from the magnetic latch 26 allowing the spring-loaded hinge 20 to take effect and raise the lid 22. The timer 28 incorporating the solenoid 30 is electrically connected by means of electrical conduit 32.

Further, as shown in FIG. 3, one bowl 14 is submerged in cooling means such as ice cubes 40 and the other bowl 16 is contained within a heater means such as heater coils 42. Therefore, bowl 14 may hold milk and be kept at a cool temperature while bowl 16 may hold solid food and be kept warm for the feeding time. It should be noted that the food in bowl 16 may be kept cool and ten minutes before lid 22 is opened the heater coils 42 will be energized to heat the food. It should also be noted that a buzzer or bell 44 can be also set so that when the lid 22 is opened another solenoid 46 will ring the bell 44 to summon the animal that the lid 22 is open. The bell 44 could also be supported on the lid 22 or incorporated within the timer 28 itself.

Another means of actuating the lid 22 is shown in FIG. 5. The lid 22 is connected to the plate 12 by means of a link 50 pivotable above a pivot 52. One end of a link 54 pivots about the container 12 at pivot 56 and its other end connects a third link or piston 58 of an actuator 60 at pivot 62. The actuator 60 pivots about a pivot 64 to rotate link 54 about pivot 56 as shown by arrows 66 and 68. In this manner, timer 28 may automatically open the lid 22 by means of the actuator 60 at a desired time as hereinbefore described.

In the operation of this electrically timed animal feeder, an electric powerline 70 will be plugged into a suitable 60-cycle wall powerline and the timer set at the desired time for feeding a pet dog or pet cat. It should be noted that the feeder 10 can be operated by a chargeable battery 72. The coil 42, which may be removable, is then placed in one compartment of the container 12 and ice 40 placed in the other. Then the plate 18 with the bowls 14 and 16 are placed within the container 12, for receiving milk or water within the bowl placed in the compartment having the ice, and for receiving meat or other solid food within the bowl placed in the coil 42 side. The spring or actuator-operated lid 22 is then closed and held in place by the latch 26 and the timer will continue operating until the preselected feeding time. At the feeding time the bell 44 will ring, the latch 26 will release the lid 22 or the actuator 60 will be activated to release the lid 22 exposing the bowls 14 and 16 and their contents for feeding.

The foregoing is considered illustrative only of the principles of the invention. Since numerous modifications and changes will readily occur to those skilled in the art, it is not desired to limit the invention to the exact construction and operation shown and described and accordingly all suitable modifications and equivalents may be resorted to as falls within the scope of the invention.

What is claimed is:

1. An electronically timed animal feeder comprising a container for supporting animal food, a lid enclosing said container, a timer set at a predetermined time for opening said lid to expose the food to feed the animal a magnetic latch, and a solenoid operable by said timer to force said lid away from said latch for opening said lid to expose the food to feed the animal.

2. An electronically timed animal feeder comprising a container for supporting animal food, a lid enclosing said container, a timer set at a predetermined time for opening said lid to expose the food to feed the animal, and actuator means interposed between said lid and said container operable by said timer for opening said lid to expose the food to feed the animal.

3. The structure of claim 2 wherein said actuator means is pivotally supported by said container and including a piston, a link having two ends pivotal about said container at substantially its central portion, one end connected to said piston and the other end connected to said lid whereby when said actuator means moves said piston it rotates said link to open said lid to expose the food to feed the animal.

* * * * *